L. A. SUBERS.
APPARATUS FOR TREATING TUBULAR FABRIC.
APPLICATION FILED MAR. 5, 1913.
1,195,414.
Patented Aug. 22, 1916.
2 SHEETS—SHEET 1.
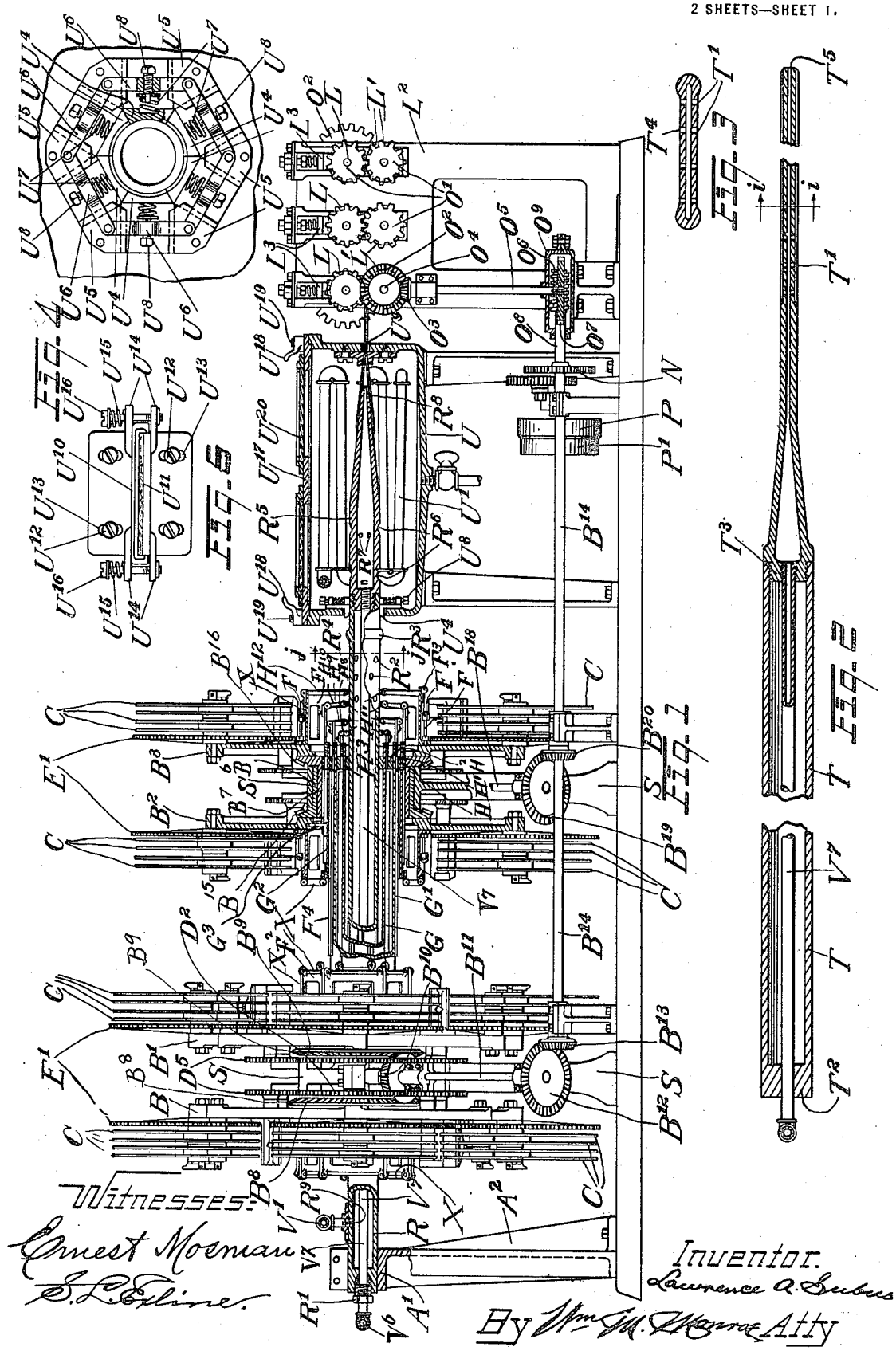
Inventor.
Lawrence A. Subers

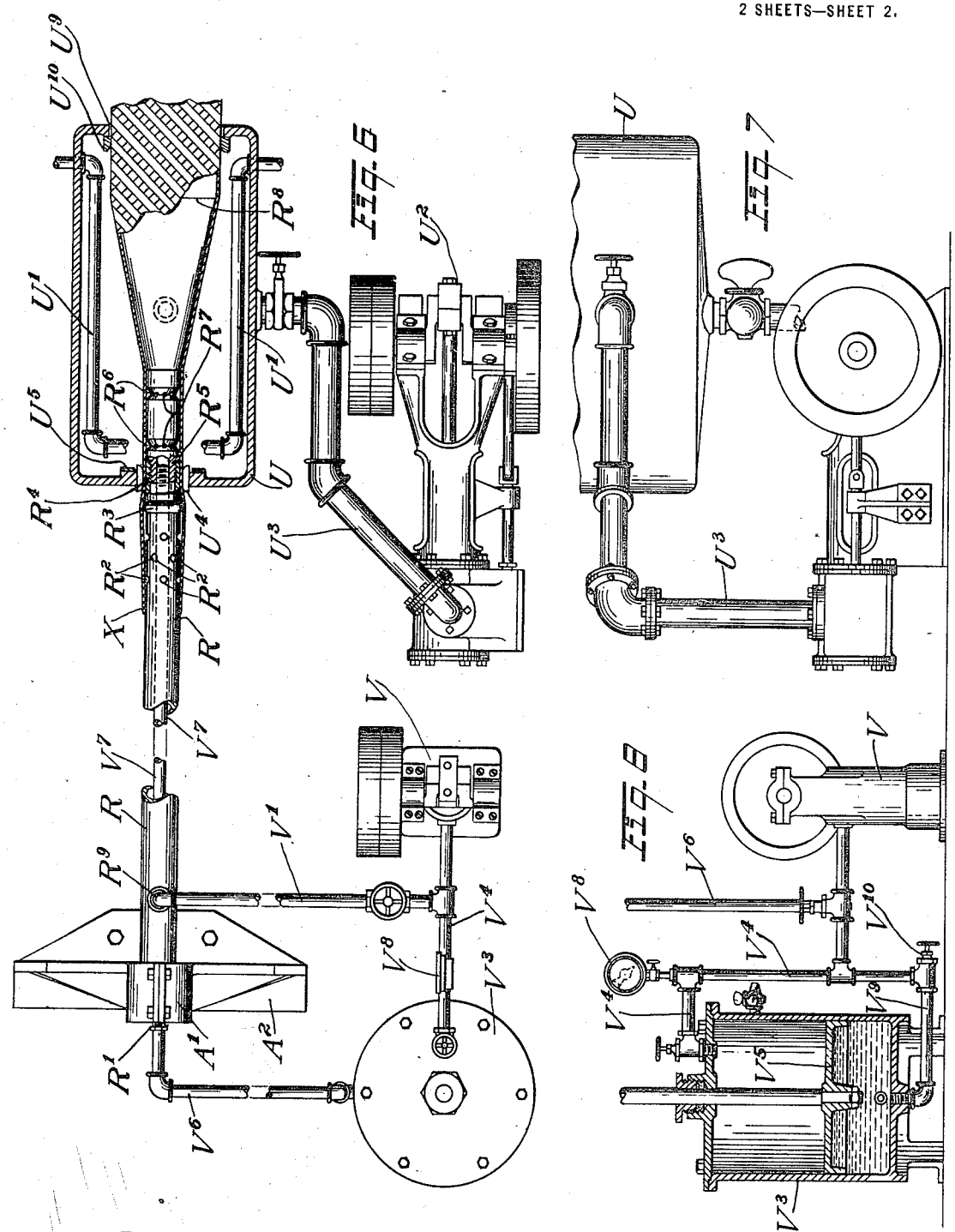

UNITED STATES PATENT OFFICE.

LAWRENCE A. SUBERS, OF CLEVELAND, OHIO.

APPARATUS FOR TREATING TUBULAR FABRIC.

1,195,414.  Specification of Letters Patent.  Patented Aug. 22, 1916.

Original application filed June 18, 1912, Serial No. 704,409. Divided and this application filed March 5, 1913. Serial No. 752,024.

*To all whom it may concern:*

Be it known that I, LAWRENCE A. SUBERS, a citizen of the United States, and resident of Cleveland, in the county of Cuyahoga and State of Ohio, have invented certain new and useful Improvements in Apparatus for Treating Tubular Fabric, of which I hereby declare the following to be a full, clear, and exact description, such as will enable others skilled in the art to which it appertains to make and use the same.

This application comprises a division of my application filed June 18, 1912, bearing Serial No. 704,409.

The objects of the invention are to provide an automatically operating machine for interwinding and laminating fibrous bands (such as described in my previously issued Letters Patent Nos. 1,024,040, 1,017,271, and 1,021,104,) which are treated and coated with liquid rubber or other adhesive substance after being wound upon a stationary mandrel to form a laminated cohesive interwound fabric.

This improved machine is particularly designed to produce a tubular laminated fabric of double thickness with selvage edges, this fabric being used for various purposes respectively, such as conduits, pneumatic tire fabric or inner linings for the same, or belting, as may be desired.

By the action of the machine the fabric is first constructed in tubular form then flattened to produce a sheet of fabric with selvage edges.

The machine includes a series of reels rotatable in alternately opposite directions about a stationary mandrel and carrying rotatable spools upon which the fibrous bands are stored, as described in the aforesaid application Serial No. 704,409.

The invention provides for treating the interior of the tubular fabric on the mandrel with liquid rubber or other adhesive material under pressure, for evaporating the solvents therein by means of an encompassing chamber wherein a predetermined degree of heat and percentage of vacuum are maintained, and also for using compressed air to force the rubber through the hollow mandrel so as to impregnate the fabric therewith.

It also provides adjustable gates or jaws for the vacuum chamber where the fabric enters and leaves.

It also provides rotating, compressing, and pulling rolls for pulling the fabric from the mandrel in a flattened state.

The invention also comprises the combination and arrangement of parts and construction of details as hereinafter described, shown in the accompanying drawings and specifically pointed out in the claims.

Figure 1 is a longitudinal vertical section of the machine as arranged for producing fabric of double thickness having selvage edges and shows the added devices for coating the interior of the fabric with rubber, and the vacuum and heat providing chamber for eliminating the solvents therefrom; Fig. 2 is a longitudinal central section of a modified form of mandrel which may be employed for the double thick fabric and which offers little resistance to its movement thereon and exposes a large amount of surface to contact with the liquid rubber; Fig. 3 is a transverse section of the mandrel on line $i$—$i$, Fig. 2; Fig. 4 is a transverse section of the mandrel on line $j$—$j$, Fig. 1, showing the movable gates which substantially exclude the air from the vacuum chamber, in which the volatile solvents are evaporated from the adhesive coatings; Fig. 5 is a similar view of the outer gate through which the flattened fabric issues; Fig. 6 is a plan view of the mandrel showing its support and the means for supplying liquid rubber or other adhesive material thereto, for exhausting the air from the vacuum chamber, for supplying heat thereto, and for supplying compressed air to expand the tubular fabric and to assist in its movement along the mandrel; Fig. 7 is a side elevation of the vacuum pump showing a portion of the vacuum chamber; Fig. 8 is an elevation of an air pump arranged for supplying compressed air to the mandrel and for supplying pressure to a tank containing rubber.

The construction of the reels is shown and described in the parent application. The reels are conveniently arranged in pairs, those in the first pair being shown at B and B' and those in the second pair at $B^2$ and $B^3$. The reels in each pair are provided with hubs one of which is sleeved over the other and both encircle the mandrel. These hubs are mounted in the standards S.

The hub $B^6$ is sleeved over the hub $B^7$ in the second pair of reels, see Fig. 1. A similar construction is employed with the first pair of reels.

The reels in each pair are rotated in opposite directions to each other. Those in the first pair B and B' are rotatel by means of beveled gears $B^8$, $B^9$ operated to revolve in opposite directions by means of the intermediate bevel gear $B^{10}$, shaft $B^{11}$, intermediate bevel gears $B^{12}$ and $B^{13}$, and longitudinal shaft $B^{14}$.

The second pair of reels $B^2$ and $B^3$ are operated in a similar manner by means of bevel gears $B^{15}$, $B^{16}$, an intermediate bevel gear, the shaft $B^{18}$ and bevel gears $B^{19}$ and $B^{20}$. Upon each reel are pivoted four sets of spools C, C two spools comprising each set, and upon these spools the fibrous bands X, X are wound.

As the bands are pulled off from the spools on the revolving reels as described in the aforesaid application, they are guided to their respective places by means of rollers F, F mounted upon adjustable stands F', F' upon annular brackets $F^2$, $F^2$, secured to their respective reels and then pass over additional rollers $F^3$ arranged to guide the bands into a horizontal position, thence the fabric bands, except those from the last reels, pass through guiding flattened tubes $F^4$, $F^4$ to the forward end of the mandrel. These tubes are supported for convenience upon a series of cylinders G, G', and $G^2$ which are attached to their respective reels by means of arms $G^3$, $G^3$ at the rear ends.

At the front ends the rings H, H', $H^2$, are concentrically arranged within the last reel and are respectively attached to a set of cylinders $G^2$, G', and G, at their forward ends and also a ring $H^3$ attached to the mandrel engages the interior of cylinder G. These rings are perforated for the passage of the fabric bands, and arms respectively attached to the forward ends of the cylinders G, G', and downwardly turned arms $H^8$, $H^9$, and $H^{10}$, provide supports for the guide rollers $H^{11}$, $H^{11}$, which guide the fabric bands to their predetermined position on the mandrel. The annular bracket $F^2$ upon the last reel $B^3$ is also provided with downwardly turned arms $H^{12}$, $H^{12}$, upon which are mounted the guide rollers $H^{11}$, $H^{11}$, for guiding the fabric bands to their respective place upon the mandrel.

In the aforesaid former application it is described how a two-ply laminated fabric composed of interwound laminated fibrous bands treated with adhesive material is constructed resulting in a tubular formation of the same.

In Figs. 1 to 8 inclusive is shown the machine arranged to form a flat fabric of double thickness and having selvage edges, the tubular laminated cohesive interwound fabric being treated interiorly with liquid rubber or other adhesive material and doubled in thickness by flattening the same. In these views reels, spools, and guiding and pulling devices for forming the laminated cohesive interwound fabric are substantially the same as previously described in the application in Ser. No. 704,409, but no cutting disk and no lining of Holland cloth for the mandrel is employed.

In addition to the described mechanism a vacuum and heating chamber for evaporating the solvents in the adhesive material is employed, and compressed air is used to assist in releasing the fabric from the mandrel. The hollow mandrel is made in two parts. The part R is secured at one end in the bearings A' of the standard $A^2$ and this end is closed and provided with a stuffing box R' for the passage of a pipe $V^7$ for rubber, and at the other end the mandrel is provided with perforations $R^2$, $R^2$, for the issuance of compressed air, and near this extremity the mandrel is provided with an exterior annular ring $R^3$, and also is threaded at this end at $R^4$ to receive the second part of the mandrel $R^5$. The part $R^5$ is also hollow and is provided with annular depressions $R^6$, $R^6$, and perforations $R^7$, $R^7$, for the passage of liquid rubber or other adhesive material, and is screwed into the end $R^4$ of the first part of the mandrel. This end of the part $R^5$ is closed and tapped to receive the rubber pipe $V^7$, while the outer end $R^8$ is flattened and perforated to allow the interior of the fabric to be further coated. A pipe V' for compressed air is connected to the mandrel R at $R^9$.

The second part of the mandrel $R^5$ is inclosed in a vacuum and heating chamber U, heat being supplied by steam pipes U' or by any other desired means. The air is exhausted from this chamber by means of the vacuum pump $U^2$ and connecting pipe $U^3$. Gates or jaws $U^4$ held in place by gibs $U^5$, and with adjustable pressure by means of yokes $U^6$, springs $U^7$, and screws $U^8$, surround the fabric on the mandrel as it enters the chamber U and substantially exclude the air. The flattened fabric leaves the chamber through the outlet $U^9$, the air being practically excluded by jaws $U^{10}$, and $U^{11}$, made adjustable by screws $U^{12}$, and slots $U^{13}$, and pressed against the fabric by arms $U^{14}$, springs $U^{15}$, and screws $U^{16}$. Access to the chamber is gained by the door plate $U^{17}$, held by locking handles $U^{18}$ and studs $U^{19}$. Glass covered openings $U^{20}$ render the interior visible.

The fabric is pulled from the mandrel by pulling and flattening rollers L, L and L', L', which are mounted in the housing frame $L^2$ which is provided with spring pressed adjustable bearings $L^3$, $L^3$, by means of which the pressure can be adjusted, and the pulling rollers are operated by means of gears O and O', bevel gears $O^2$, $O^3$, and shafts $O^4$, $O^5$ and worm and worm wheel $O^6$, $O^7$, mounted in the bracket $O^9$, and by shaft $O^8$. (See Fig. 1.)

Compressed air is furnished by the air compressor V connected to the mandrel by pipe V' and is supplied to the rubber tank V² by the pipe V⁴ and acting on the piston V⁵ forces the liquid rubber or other adhesive material through the pipe V⁶ to the pipe V⁷ in the hollow mandrel R. A gage V⁸ registers the air pressure used. A secondary pipe V⁹ can be used to raise the piston V⁵ when the rubber tank is empty. A valve V¹⁰ closes this pipe when rubber is being forced from the tank.

As the fabric is formed on the mandrel R it is expanded by the compressed air acting through the perforations R² and by the annular ring R³, thus being practically released from adhesion to the mandrel, and is pulled into the vacuum chamber U where liquid rubber or other adhesive material is forced through the perforations R² and through the end of the mandrel R³, to thoroughly coat and impregnate the interior of the fabric, the solvents being quickly evaporated by the predetermined amount of heat and percentage of vacuum maintained in the chamber. The pulling and compressing rolls collapse the tubular band into a solid sheet of double thickness with selvage edges.

Fig. 2 shows the mandrel adapted for use in forming a double layer fabric with selvage edge, and similar to the mandrel R except that its outer portion is flattened, and that it is not necessary to use compressed air. The mandrel consists of two parts T and T'. The part T is cylindrical, hollow, closed at the end T² to receive the pipe V⁷ for rubber and threaded at T³ to receive the flattened part T' which is tapped to receive the pipe V⁷. The part T' is also hollow, grooved, top and bottom, to reduce the friction of the fabric thereon, and perforated at T⁴, T⁴ for rubber or other adhesive material, and also at the end T⁵. The grooved part of the mandrel lies wholly in the vacuum chamber V and the rubber emerging from the perforations T⁴, T⁴ and from the end T⁵ coats the interior of the fabric.

I have shown in the drawings and particularly described in the specification certain preferred embodiments of my invention, but these embodiments are to be regarded as illustrative only, and I do not intend to limit myself to the details thereof.

It is obvious that my invention is capable of many modifications, all of which are included within the scope of the claims.

I claim—

1. In a fabric forming machine, a hollow mandrel fixed at one end and formed in outer and inner portions, each portion provided with openings therethrough, a pipe extending through the inner portion and into the outer portion for supplying fluid coating material to the outer portion, and a pipe communicating with the inner portion for supplying compressed air thereto, the outer extremity of the outer portion being flattened, substantially as and for the purpose set forth.

2. In a fabric making machine, the combination with a mandrel and a combined vacuum and drying chamber, inclosing a portion of said mandrel, of resilient air excluding gates in one wall of said chamber, through which said mandrel and fabric thereon pass.

3. In a fabric making machine, the combination with a vacuum chamber having openings in its walls, of a mandrel upon which said fabric is wound, said mandrel having an outer extremity passing into said vacuum chamber through one of said openings, and movable and spring pressed gates encircling said opening and adapted to exclude air from said chamber.

4. In combination, in a fabric making machine, a mandrel fixed at one end, a vacuum chamber having an opening through which the forward extremity of the mandrel extends, a series of gates encircling the mandrel, in said opening, and means for controlling the pressure upon said gates.

5. An apparatus for treating tubular fabric comprising in combination, a hollow mandrel fixed at one end and formed in inner and outer portions, each of said portions being provided with openings therethrough, means for supplying compressed air to the inner portion, and means for supplying the outer portion with an impregnating liquid.

6. An apparatus for treating tubular fabric comprising in combination, a hollow mandrel fixed at one end and open at the other end, means for drawing fabric over said mandrel, and means for forcing a coating fluid through the open end of said mandrel into the interior of said fabric.

7. A mandrel for coating fabric having a free end portion of flattened cross section and provided with thickened edges, the area of said portion between said edges having apertures therein.

In testimony whereof, I hereunto set my hand this 25th day of February 1913.

LAWRENCE A. SUBERS.

In presence of—
ERNEST MOSMAN,
F. H. TOWNSEND.